(12) United States Patent
Hsu et al.

(10) Patent No.: US 6,970,867 B1
(45) Date of Patent: Nov. 29, 2005

(54) BOOKMARKING OF WEB PAGE FRAMES IN WORLD WIDE WEB FOR ACCESSING WEB PAGES WITHIN A FRAMES IMPLEMENTATION

(75) Inventors: Peter Yue-der Hsu, Austin, TX (US); Matthew Jacob Perrins, Northants (GB)

(73) Assignee: International Business Machines Corporation, Armonk, NY (US)

(*) Notice: Subject to any disclaimer, the term of this patent is extended or adjusted under 35 U.S.C. 154(b) by 591 days.

(21) Appl. No.: 09/190,554

(22) Filed: Nov. 12, 1998

(51) Int. Cl.[7] .......................... G06F 17/30
(52) U.S. Cl. .................. 707/4; 707/100; 707/104; 709/203; 709/205; 709/219
(58) Field of Search .............. 345/357; 395/347, 395/200, 33; 709/218, 203, 205, 219; 707/501, 707/104, 4, 100, 513

(56) References Cited

U.S. PATENT DOCUMENTS

| | | | | |
|---|---|---|---|---|
| 5,243,739 A | * | 9/1993 | Schmidt ................... 24/135 R |
| 5,893,109 A | * | 4/1999 | DeRose et al. ............. 707/104 |
| 5,918,010 A | * | 6/1999 | Appleman et al. .......... 709/203 |
| 5,918,237 A | * | 6/1999 | Montalbano ................ 707/513 |
| 5,963,964 A | * | 10/1999 | Nielsen ....................... 707/501 |
| 6,012,090 A | * | 1/2000 | Chung et al. ............... 709/219 |
| 6,037,934 A | * | 3/2000 | Himmel et al. ............. 345/335 |
| 6,067,565 A | * | 5/2000 | Horvitz ....................... 709/218 |
| 6,072,490 A | * | 6/2000 | Bates et al. ................. 345/347 |
| 6,085,226 A | * | 7/2000 | Horvitz ....................... 709/203 |
| 6,100,890 A | * | 8/2000 | Bates et al. ................. 345/357 |
| 6,144,375 A | * | 11/2000 | Jain et al. ................. 707/500.1 |
| 6,144,991 A | * | 11/2000 | England ..................... 709/205 |
| 6,163,779 A | * | 12/2000 | Mantha et al. ............. 707/100 |
| 6,195,681 B1 | * | 2/2001 | Appleman et al. .......... 709/203 |
| 6,202,060 B1 | * | 3/2001 | Tran ............................... 707/3 |
| 6,202,199 B1 | * | 3/2001 | Wygodny et al. ............. 717/4 |
| 6,262,724 B1 | * | 7/2001 | Crow et al. ................. 345/723 |
| 2001/0001863 A1 | * | 5/2001 | Shuster ....................... 709/203 |

* cited by examiner

Primary Examiner—Charles Rones
(74) Attorney, Agent, or Firm—Mark S. Walker; Jerry B. Kraft (57) ABSTRACT

A process in a computer managed communication network such as the World Wide Web with user access via a plurality of data processor controlled interactive display stations and with a system for displaying documents, e.g. Web pages, transmitted to said display stations from locations remote from said stations which provides the user with the option of bookmarking a whole document or just sections of the document. Conventional means associated with one of said receiving display stations are provided for bookmarking selected transmitted documents, e.g. whole Web pages to thereby store at said receiving display station, direct links to the documents for future access. In combination with this function, the invention provides the document or Web page creator with the facility of defining one or more sections of the document or Web page as independent secondary documents together with the facility at the receiving display station for optionally bookmarking any secondary document to thereby store at the receiving display station, a direct link to the secondary document without accessing the basic transmitted document.

21 Claims, 8 Drawing Sheets

BOOKMARKING OF WEB PAGE FRAMES IN WORLD WIDE WEB FOR ACCESSING WEB PAGES WITHIN A FRAMES IMPLEMENTATION

TECHNICAL FIELD

The present invention relates to computer managed communication networks, such as the world wide web, and particularly to ease of use of interactive computer controlled display interfaces to networks for substantially reducing the time and resources required to access portions of complex and/or lengthy web pages.

BACKGROUND OF THE INVENTION

The 1990's decade has been marked by a technological revolution driven by the convergence of the data processing industry with the consumer electronics industry. The effect has in turn driven technologies which have been known and available but relatively quiescent over the years. A major one of these technologies is the internet related distribution of documents, media and programs. The convergence of the electronic entertainment and consumer industries with data processing exponentially accelerated the demand for wide ranging communications distribution channels and the World Wide Web (Web) or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources which were at first text and then evolved into media, i.e. "hypermedia". This even further exploded the use of the Internet or Web. It was now possible for the Web browser or wanderer to spend literally hours going through document after document and accompanying media events in often less than productive excursions through the Web. These excursions often strained the user's time and resources. In order for the Internet to mature to its great expectations to solid commercial fruition, it will be necessary for the Internet to greatly reduce its drain on time and related resources. A significant source of this drain is in the Web page, the basic document page of the Web. Web pages still do not have much in the way of interface standards. Although many Web pages are professionally designed and, thus, relatively efficient to use, there are still a great many Web pages which are very cumbersome to access and to use. This may be due to the length and organization of the page which causes the user to load and then scroll through the lengthy page to reach the area of interest on the page. Even lengthy Web page browsing cycles in reaching areas of interest would be tolerable if the user could, upon finding the area, create a bookmark which would take him directly to the page area or section without going through the process of bookmarking and thereby accessing the entire long Web page and then going through the page until the area of interest is reached.

SUMMARY OF THE INVENTION

The present invention overcomes these prior art problems by providing a method and program whereby a user may easily bookmark sections of a network, e.g. Web transmitted documents. The user then has the option of bookmarking the whole document or just sections of the document. The invention is directed to a computer managed communication network, such as the Web, with user access via a plurality of data processor controlled interactive display stations and with a system for displaying documents, e.g. Web pages transmitted to said display stations from locations remote from said stations. The invention provides for the conventional means associated with one of said receiving display stations for bookmarking selected transmitted documents, e.g. whole Web pages to thereby store at said receiving display station, direct links to the documents for future access. In combination with this function, the invention provides the document or Web page creator with the facility of defining one or more sections of the document or Web page as independent secondary documents together with the facility at the receiving display station for optionally bookmarking any secondary document to thereby store at the receiving display station, a direct link to the secondary document without accessing and first passing through the basic transmitted document. The invention is implemented by designing both the basic and secondary documents as hypertext, particularly HTML documents, and defining the secondary documents within the basic document or Web page through the use of JavaScript.

It should be noted that while the secondary or framed documents may be bookmarked so that they may be accessed without first accessing or going through their primary transmitted document, i.e. the Web page, nonetheless a feature of the present invention is that once the secondary document is, thus, directly accessed, its related Web page and, consequently, other secondary documents on the Web page may then be accessed through the accessed bookmarked secondary document.

DETAILED DESCRIPTION OF THE PREFERRED EMBODIMENT

Figure 1:
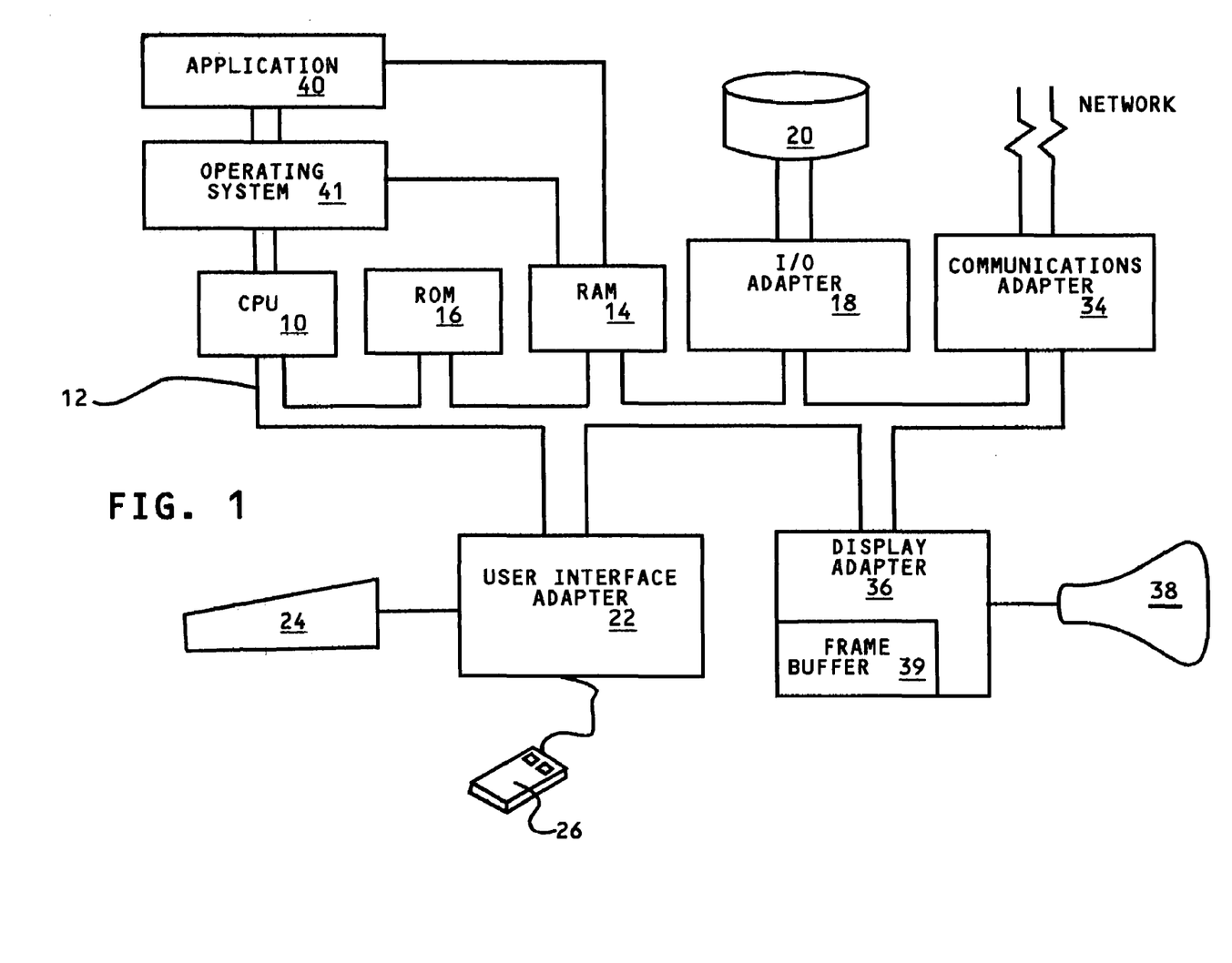
FIG. 1 is a block diagram of a data processing system including a central processing unit and network connections via a communications adapter which is capable of implementing the receiving display station on which the received Web page may be processed in accordance with the present invention.

Referring to FIG. 1, a typical data processing terminal is shown which may function as a basic computer controlled network receiving terminal used in implementing the present invention for the bookmarking of secondary pages defined by frames in received Web pages. A central processing unit (CPU) 10, such as one of the PC microprocessors or workstations, e.g. RISC System/6000™ (RS/6000) (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of International Business Machines Corporation); Microsoft's Windows 95™ or Windows NT™, as well as UNIX and AIX operating systems. Application programs 40 controlled by the system are moved into and out of the main memory RAM 14. These programs include the program of the present invention to be subsequently described in combination with any conventional Web browser, such as the Netscape 3.0™ or Microsoft's Explorer™. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Web or Internet. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for bookmarking according to the present invention. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to documents, such as Web pages, transmitted over networks, an understanding of networks and their operating principles would be helpful. We will not go into great detail in describing the networks to which the present invention is applicable. Reference has also been made to the applicability of the present invention to a global network such as the Internet. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. A network may be as simple as two linked computers or it may be any combination of LANs or WANs. Of course, the Internet or Web is a global network of a heterogeneous mix of computer technologies and operating systems. Higher level objects are linked to the lower level objects in the hierarchy through a variety of network server computers. These network servers are the key to network distribution such as the distribution of Web pages and related documentation. The HTML language is described in detail in the text entitled *Just Java*, particularly at Chapter 7, pp. 249–268, dealing with the handling of Web pages and also in the above-referenced *Mastering the Internet*, particularly pp. 637–642 on HTML in the formation of Web pages. In addition, significant aspects of this invention will involve Web browsers. A general and comprehensive description of browsers may be found in the above-mentioned *Mastering the Internet* text at pp. 291–313.

Figure 2:
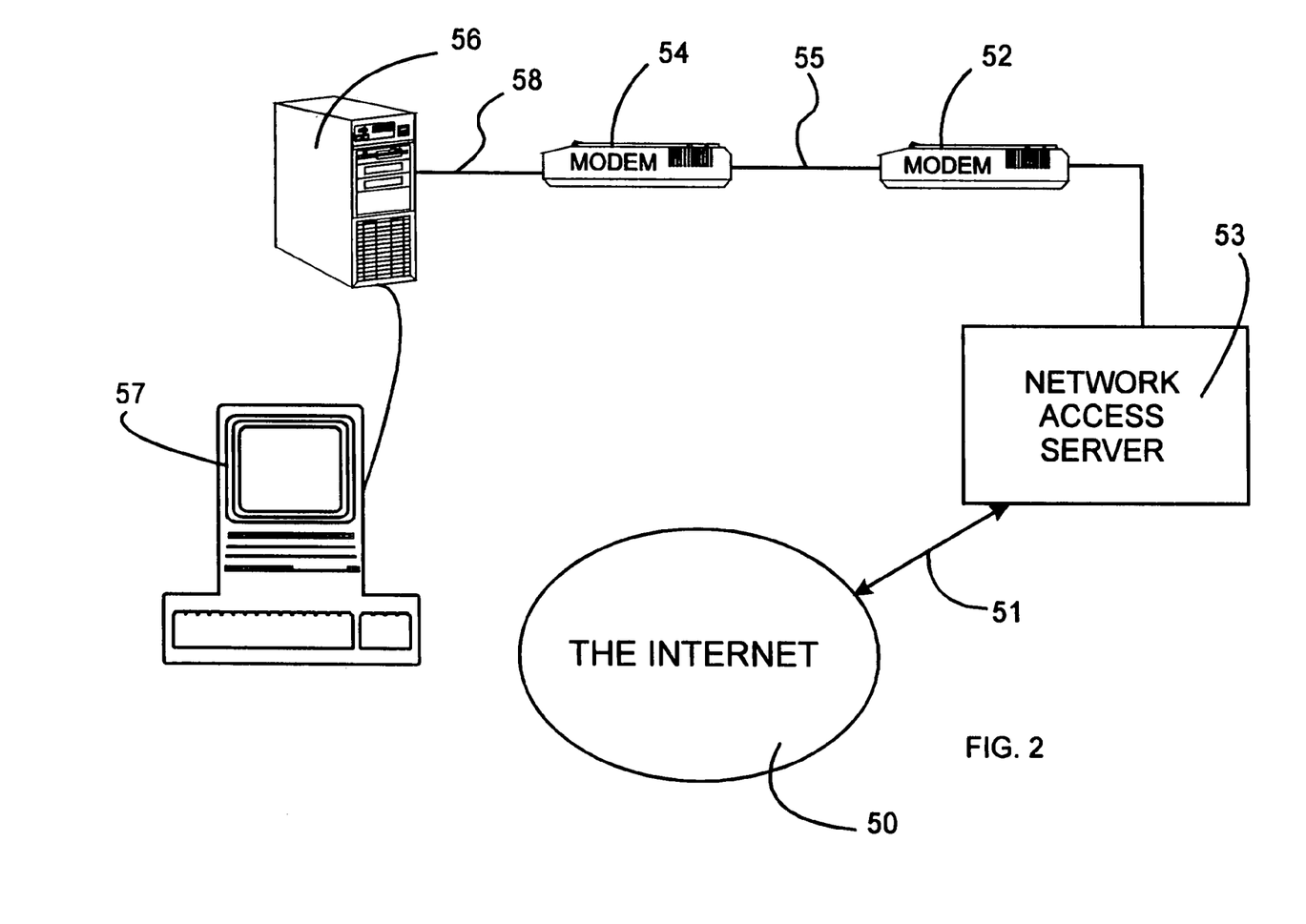
FIG. 2 is a generalized diagrammatic view of an Internet portion upon which the present invention may be implemented.

A generalized diagram of a portion of an Internet, which the computer 56 controlled display terminal 57 used for Web page or other document display of the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned *Mastering the Internet*, pp. 136–147, for typical connections between local display workstations to the Internet via network servers, any of which may be used to implement the system on which this invention is used. The system embodiment of FIG. 2 is one of these known as a host-dial connection. Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51.

Figure 8:
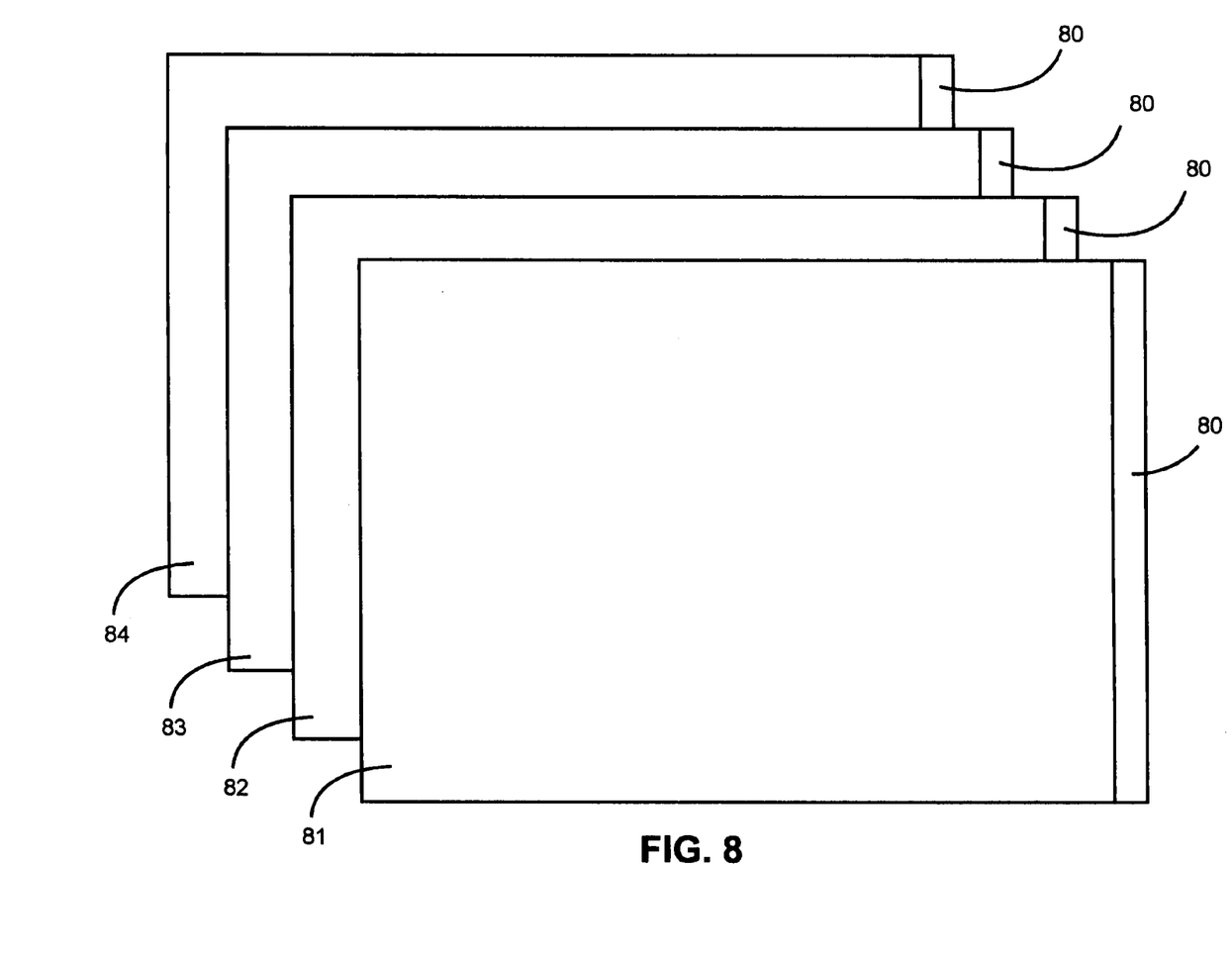
FIG. 8 is a diagrammatic illustration of the data structure supporting the primary Web page and several secondary framed documents on said Web page to show their relationship.

Operating with HTML documents in frames and the construction of such documents is described in the text, *Dynamic HTML in Action*, Michele Petrovsky, published by Osborne, McGraw-Hill, Berkeley, Calif., 1998, particularly at pages 150–157. The frames are not documents, they define the parameters which documents with assigned HTML tags fill. In most conventional Web browsers, a window is anything within which you may display a defined HTML document. In the present invention, since the HTML contents of the frames defining the basic Web page and its related secondary documents are related, their respective frames may be referenced to each other in a frame set. FIG. 8 is a very generalized illustration of a data structure defining a frame set showing the relationships of the basic Web page frame and its related secondary documents. To simplify, for purposes of illustration, the frame set may be considered to comprise a stack of frames arranged in an overlapping window data structure. The frames in which the respective HTML contents of Web page and its secondary documents are stored, each comprise a main frame such as frame 81 containing the basic Web page HTML and main frames 82 to 84, each respectively containing the HTML contents of a secondary document within the Web page, as well as an individual HTML name. Each of these main frames has an associated global frame 80 which contains the global information correlating the main frame with the other main frames in the set. In this manner, as will be hereinafter described in greater detail, after the HTML contents of and the name of a particular secondary document frame 82–84 have been individually bookmarked, when the secondary document is directly accessed through its bookmark and displayed, its associated Web page and other secondary documents may be accessed based upon the connecting information in the global frames 80.

Figure 3:
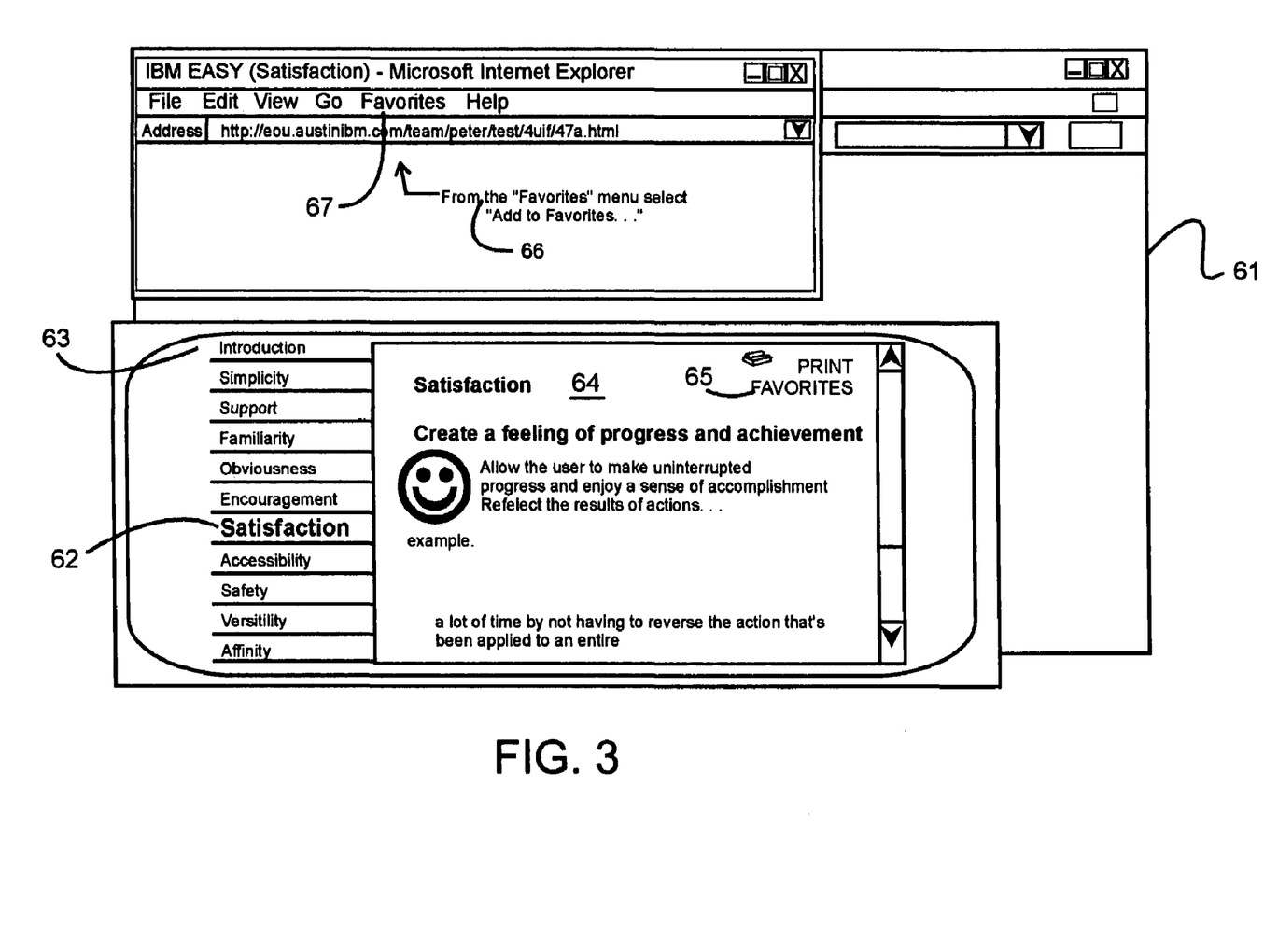
FIG. 3 is a diagrammatic illustration of a display screen showing a portion of a Web page having a defined frame at an initial stage in bookmarking the frame.
Figure 4:
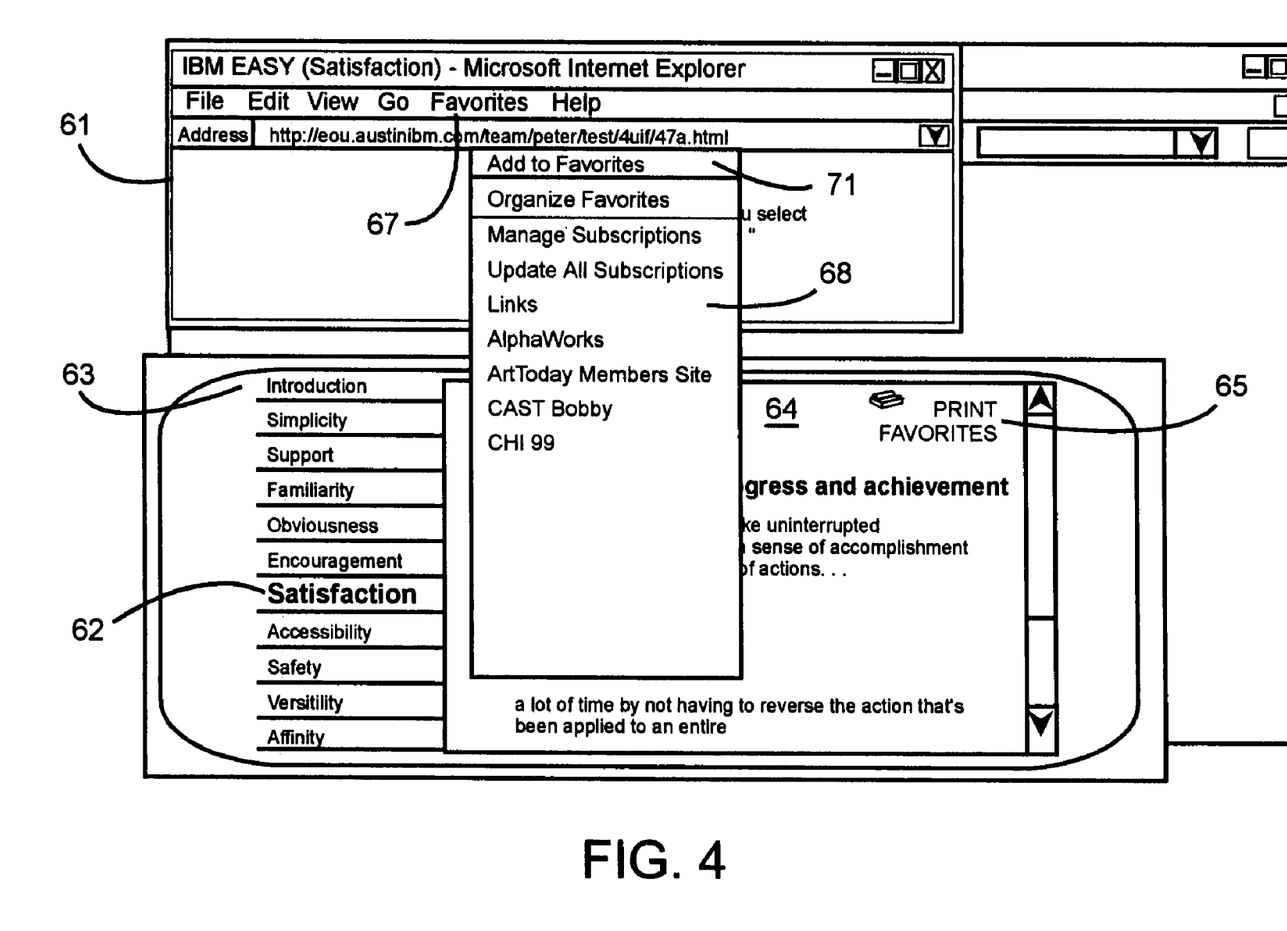
FIG. 4 is the display screen of FIG. 3 at a next stage in bookmarking the frame.
Figure 5:
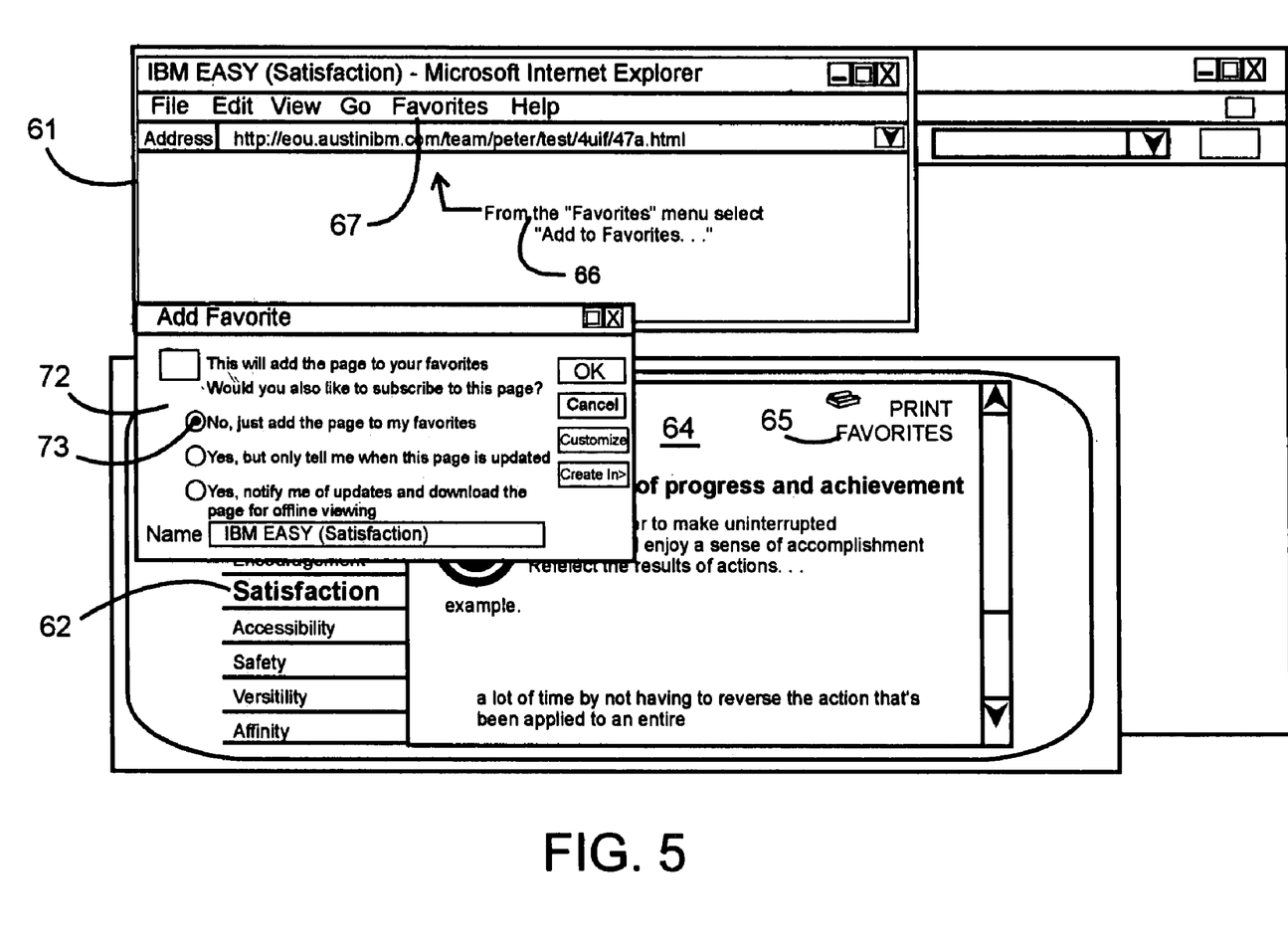
FIG. 5 is the display screen of FIG. 4 at a final stage of bookmarking the frame.

Now with respect to FIGS. 3 through 5, we will provide an illustrative example of how the present invention may be used to bookmark a Web page in the customary manner on a browser and how secondary documents on the page may be bookmarked in accordance with the present invention. When the screen images are described, it will be understood that these may be rendered by storing image and text creation programs, such as those in any conventional window operating system and in a standard browser program in the RAM 14 of the system of FIG. 1. The operating system is diagrammatically shown in FIG. 1 as operating system 41. The display screens of FIGS. 3 through 7 are presented to the viewer on display monitor 38 of FIG. 1. In accordance with conventional techniques, the user may control the screen interactively through a conventional I/O device such as mouse 26, FIG. 1, which operates through user interface 22 to call upon programs in RAM 14 cooperating with the operating system 41 to create the images in frame buffer 39 of display adapter 36 to control the display on monitor 38.

The initial display screen of FIG. 3 shows a display screen where a browser program, Microsoft Internet Explorer™, has been used to access a Web page 63 into display space 61. In addition, the selecting of a link 62, "Satisfaction", from the options on the Web page 63, which has resulted in the accessing and display of secondary document 64, entitled "Satisfaction". At this point, the user may add a bookmark back to his whole Web page 63 by clicking on "Favorites" (bookmark) option 67 on the basic menu bar which will cause the browser program to add the whole Web page entitled "IBM Easy" to be bookmarked in the conventional browser manner. If the user wishes to bookmark the secondary document 64, then the user presses bookmarking feature 65 (Favorites) when the user cursor is within secondary document 64. This is the feature provided by this invention to be used only for the bookmarking of secondary documents. This results in the appearance of prompt 66, but this time the user follows its instructions and goes on to select the Favorites option 67 from the menu bar that results in drop down menu 68, FIG. 4, which in addition to a selection of already bookmarked Favorites contains the option 71 "Add to Favorites". Then, when the user selects the option 71 the result is dialog panel 72 appearing, FIG. 5, from which, the user then may, by confirming the option 73 by pressing the standard OK button, cause the secondary document 64 to be bookmarked and added to the list of bookmarked documents in Favorites menu 68. It should be noted that this confirmatory selection 73 results in whichever frame in the stored frame set shown in FIG. 8 being brought to the top of the stack. If we would assume that the HTML for document 64 would be in frame 84 then that frame 84 would be brought to the top of the frame set stack so that it could be appropriately bookmarked. When a bookmarked secondary document is subsequently accessed through its bookmark, it still retains its connections with the basic Web page and other secondary documents on the Web page by means of JavaScript code embedded in HTML text of the secondary bookmarked document. Thus, when a secondary bookmarked document is accessed through its bookmark, the basic browser being used interprets the JavaScript code in the bookmarked secondary document and displays all other secondary documents associated with it.

JavaScript is a conventional simple interpreted scripting language that enables Web page developers to embed simple Java-like programming instructions within the HTML text of Web pages. For further information with respect to the use of JavaScript within HTML text in Web page frames, reference is made to the above-mentioned text, *Dynamic HTML in Action*, Petrovsky, particularly at pages 150–158 and 184–185.

Figure 6:
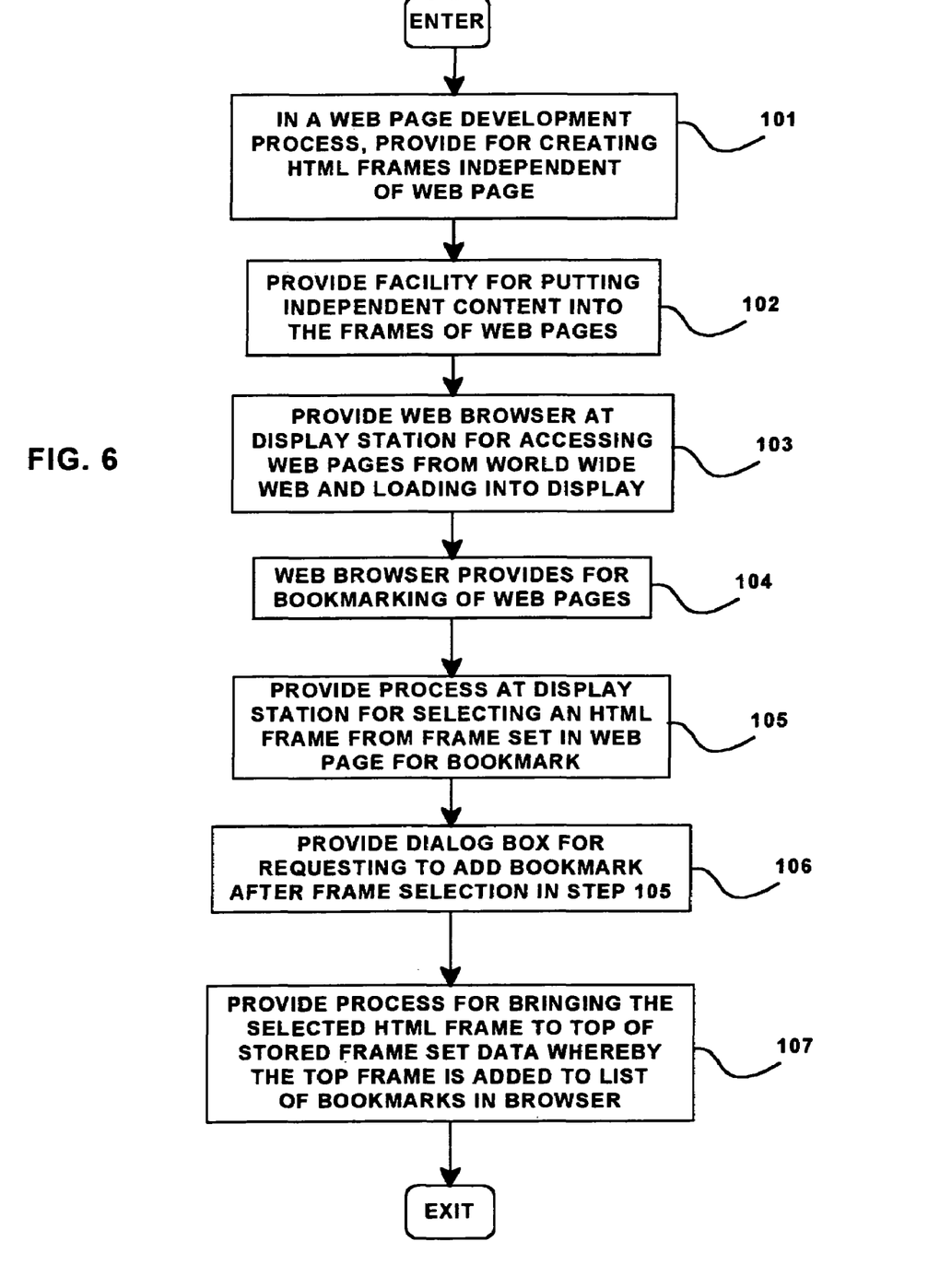
FIG. 6 is a general flowchart of a programming set up to implement the present invention for bookmarking secondary pages defined by frames in a Web page.
Figure 7:
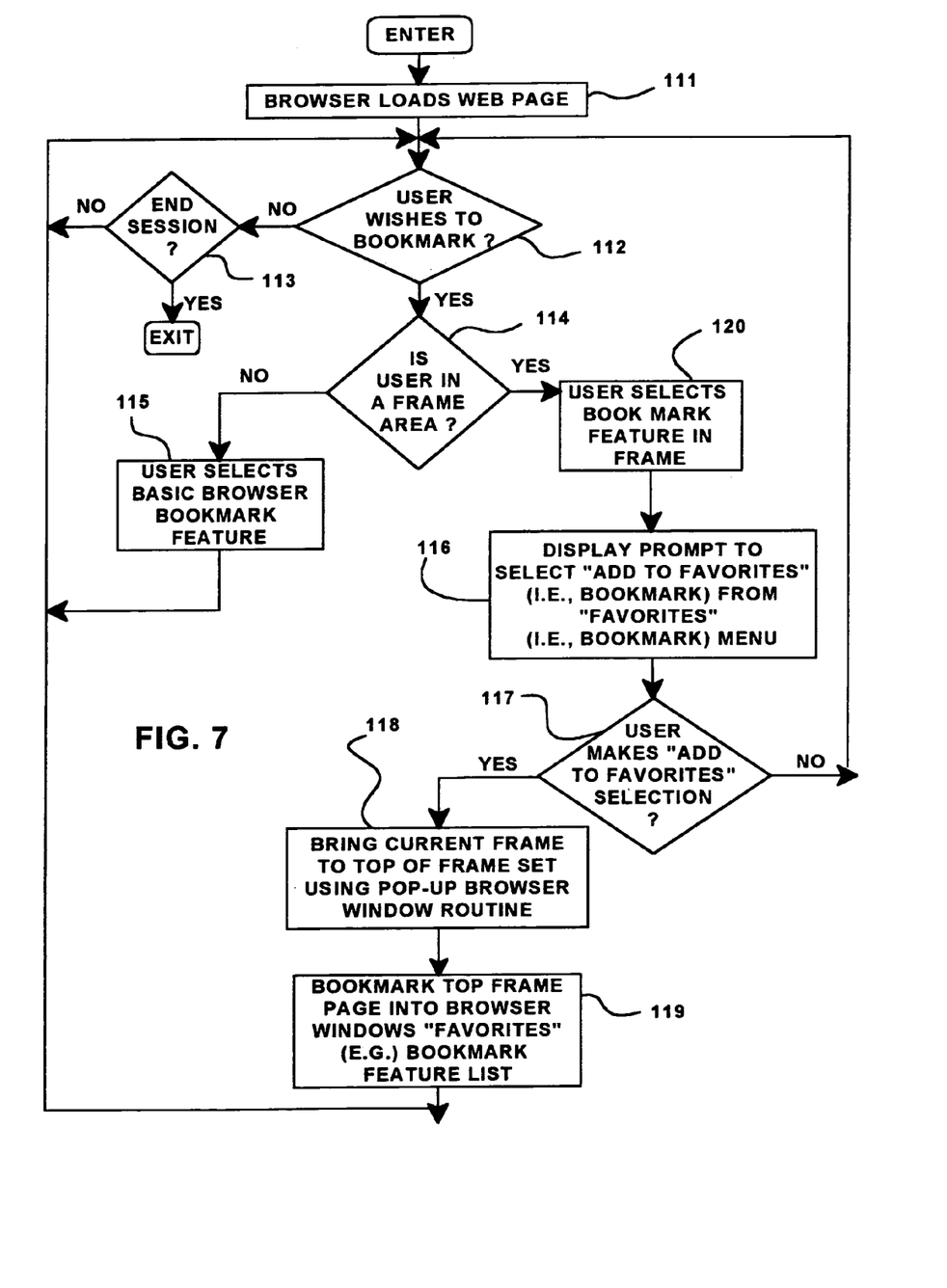
FIG. 7 is a flowchart of an illustrative run of the program set up in FIG. 6.

Now with reference to FIGS. 6 and 7 we will describe a process implemented by the present invention in conjunction with the flowcharts of these figures. FIG. 6 is a flowchart showing the development of a process according to the present invention for enabling a user of a Web page to bookmark secondary documents within the page. With reference to FIG. 6, first, process step 101, in implementing the program the Web page developer is provided with the facility of creating within the Web page, HTML frames which are independent of the Web page, but nonetheless globally connected to the Web page as described with respect to FIG. 8. The developer may, of course, put content into the framed documents, step 102. Then, step 103, a conventional Web browser program is provided at the Web page receiving display station, e.g. the computer controlled display of FIG. 1 or display station 56, 57 of FIG. 2. The Web browser provides for the bookmarking of Web pages in the conventional manner, step 104. A program routine is provided at the receiving display station for designating a HTML frame representing a secondary document in the Web page to be added to bookmarks, step 105, e.g. FIGS. 3, and in response to such a request, providing a dialog box for adding such a bookmark, step 106, (see "Add to Favorites" entry FIG. 4 and confirmatory dialog box entry 73 in FIG. 5). Lastly, step 107, a process is provided for bringing the designated HTML frame to the top of the stored frame set data whereby the top frame is added to the conventional list of bookmarks in the browser, as described with respect to FIG. 8.

The running of the process will now be described with respect to FIG. 7. First, step 111, when there is a received Web page, the browser program loads the page into the receiving computer display, step 111. Then a determination is made as to whether the user has pressed the bookmark, i.e. "Favorites" button, decision step 112. If No, there may be a determination made, step 113, as to whether the session is over. If Yes, then exit. Let us assume No, then the flow returns to 112 where the user continues to work with the page until the bookmark button is pressed and the step 112 decision is Yes. At this point a determination is made via decision step 114 as to whether the user, i.e. cursor, is in the Web page in general or in a particular HTML frame. If there is a No decision from step 114 indicating that the user is not in any frame and, thus, is in the Web page in general, the conventional browser program is permitted to designate the Web page as bookmarked and add the Web page to the standard browser list, step 115, and the process is then returned to step 112. On the other hand, if the decision from step 114 is Yes, then the user is urged via prompt 66, FIG. 3, to select "Add to Favorites" from the Favorites menu 68, FIG. 4, which then has to be confirmed via dialog box selection 73, FIG. 5. Note that the user may at this point decide not to add a bookmark at either stage of FIG. 4 or FIG. 5. In such a case, the decision from step 117 would be No and the process would return to step 112, FIG. 7. However, if the decision from step 117 is Yes, the user chooses to add the bookmarked secondary frame HTML page to the bookmark list, then, step 118, the frame in the set containing the secondary page will be brought to the top of the stored frame set as described with respect to FIG. 8 and the bookmarked secondary page will be added to the standard "Favorites" list, step 119, after which the process returns to step 112 where a determination is made as to further bookmarks.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled interactive display stations and with a system for displaying documents transmitted to said display stations from locations remote from said stations, a system for bookmarking sections of said transmitted documents comprising:
   means associated with one of said receiving display stations for bookmarking selected transmitted documents to thereby store at said receiving display station, direct links to the documents at said remote locations for future access,
   means in a document transmitted from a single remote location for defining at least one section in the document as an independent secondary document, and
   means at said receiving display station for bookmarking said secondary document to thereby store at said receiving display station, a direct link to the secondary document at said single remote location, said link circumventing said transmitted document.

2. The system of claim 1 wherein said network is the World Wide Web.

3. The system of claim 2 wherein the transmitted documents are hypertext documents.

4. The system of claim 3 wherein the transmitted documents are Web pages in Hypertext Markup Language.

5. The system of claim 4 wherein said secondary document is defined by frames within a Web page and is also in Hypertext Markup Language.

6. The system of claim 5 further including:
   means for displaying a list of said bookmarked documents, and
   means for adding said secondary bookmarked documents to said list.

7. The system of claim 5 further including:
   means for accessing and displaying said secondary documents via said direct link, and
   means for maintaining connections between said secondary documents and said transmitted documents, whereby said transmitted documents may be accessed and displayed through said accessed secondary documents.

8. In a computer managed communication network with user access via a plurality of data processor controlled interactive display stations and with a system for displaying documents transmitted to said display stations from locations remote from said stations, a method for bookmarking sections of said transmitted documents comprising:
   bookmarking at one of said receiving display stations selected transmitted documents to thereby store at said receiving display station, direct links to the documents at said remote locations for future access,
   defining in a document transmitted from a single remote location at least one section as an independent secondary document, and
   bookmarking said secondary document at said receiving display station to thereby store at said receiving display station, a direct link to the secondary document at said single remote location without accessing said transmitted document.

9. The method of claim 8 wherein said network is the World Wide Web.

10. The method of claim 9 wherein the transmitted documents are hypertext documents.

11. The method of claim 10 wherein the transmitted documents are Web pages in Hypertext Markup Language.

12. The method of claim 11 wherein said secondary document is defined by frames within a Web page and is also in Hypertext Markup Language.

13. The method of claim 12 further including the step of:
   displaying a list of said bookmarked documents, and
   adding said secondary bookmarked documents to said list.

14. The method of claim 12 further including the steps of:
   accessing and displaying said secondary documents via said direct link, and
   maintaining connections between said secondary documents and said transmitted documents, whereby said transmitted documents may be accessed and displayed through said accessed secondary documents.

15. A computer program having code recorded on a computer readable medium for bookmarking sections of transmitted documents in a computer managed communication network with user access via a plurality of data processor controlled interactive display stations and with a system for displaying documents transmitted to said display stations from locations remote from said stations comprising:
   means for bookmarking selected transmitted documents to thereby store at a receiving display station, direct links to the documents at said remote locations for future access,
   means in a transmitted document defining at least one section in the document as an independent secondary document, and
   means for bookmarking said secondary document to thereby store at said receiving display station, a direct link to the secondary document at one of said remote locations without accessing said transmitted document.

16. The computer program of claim 15 wherein said network is the World Wide Web.

17. The computer program of claim 16 wherein the transmitted documents are hypertext documents.

18. The computer program of claim 17 wherein the transmitted documents are Web pages in Hypertext Markup Language.

19. The computer program of claim 18 wherein said secondary document is defined by frames within a Web page and is also in Hypertext Markup Language.

20. The computer program of claim 19 further including:
   means for displaying a list of said bookmarked documents, and
   means for adding said secondary bookmarked documents to said list.

21. The computer program of claim 19 further including:
   means for accessing and displaying said secondary documents via said direct link, and
   means for maintaining connections between said secondary documents and said transmitted documents, whereby said transmitted documents may be accessed and displayed through said accessed secondary documents.

* * * * *